US009852494B2

(12) United States Patent
Kosaki

(10) Patent No.: US 9,852,494 B2
(45) Date of Patent: Dec. 26, 2017

(54) OVERHEAD IMAGE GENERATION APPARATUS

(71) Applicant: Toshiba Alpine Automotive Technology Corporation, Iwaki-shi (JP)

(72) Inventor: Masanori Kosaki, Iwaki (JP)

(73) Assignee: Toshiba Alpine Automotive Technology Corporation, Iwaki-shi (JP)

( * ) Notice: Subject to any disclaimer, the term of this patent is extended or adjusted under 35 U.S.C. 154(b) by 0 days.

(21) Appl. No.: 15/014,186

(22) Filed: Feb. 3, 2016

(65) Prior Publication Data
US 2016/0350894 A1 Dec. 1, 2016

(30) Foreign Application Priority Data
Jun. 1, 2015 (JP) ................................. 2015-111235

(51) Int. Cl.
G06T 3/40 (2006.01)
B60R 1/00 (2006.01)
(Continued)

(52) U.S. Cl.
CPC .............. G06T 3/4038 (2013.01); B60R 1/00 (2013.01); B60R 11/04 (2013.01); G06T 3/0012 (2013.01);
(Continued)

(58) Field of Classification Search
USPC ........................................................ 396/164
See application file for complete search history.

(56) References Cited

U.S. PATENT DOCUMENTS 7,307,655 B1 * 12/2007 Okamoto ........... G06K 9/00791
348/222.1
8,243,994 B2 8/2012 Suzuki et al.
(Continued)

FOREIGN PATENT DOCUMENTS

JP 2008-141643 6/2008
JP 2010-128951 6/2010
(Continued)

OTHER PUBLICATIONS

Sawhney H S et al., "True Multi-Image Alignment and its Application to Mosaicing and Lens Distortion Correction" IEEE Transactions on Pattern Analysis and Machine Intelligence, IEEE Computer Society, vol. 21, No. 3, XP000833459, Mar. 1, 1999, pp. 235-243.
(Continued)

Primary Examiner — Clayton E Laballe
Assistant Examiner — Linda B Smith
(74) Attorney, Agent, or Firm — Oblon, McCelland, Maier & Neustadt, L.L.P.

(57) ABSTRACT

According to one embodiment, an overhead image generation apparatus includes: a plurality of cameras mounted to a vehicle; an image processor that takes in images of respective cameras, generates, for respective cameras, overhead images that have been subjected to viewpoint conversion processing based on calibration data of the cameras and virtual viewpoint/line-of-sight information, and generates a synthesized overhead view by connecting the overhead images at their boundaries; and a display device that displays the synthesized overhead view generated by the image processor, wherein a proportion of a shape of the overhead image in a height direction is changed in proportion to an arrangement height of each camera.

12 Claims, 10 Drawing Sheets

(51) Int. Cl.
*B60R 11/04* (2006.01)
*G06T 3/00* (2006.01)
*H04N 5/225* (2006.01)
*H04N 5/247* (2006.01)
*H04N 7/18* (2006.01)

(52) U.S. Cl.
CPC ........... *H04N 5/2254* (2013.01); *H04N 5/247* (2013.01); *H04N 7/181* (2013.01); *B60R 2300/105* (2013.01); *B60R 2300/205* (2013.01); *B60R 2300/303* (2013.01)

(56) References Cited

U.S. PATENT DOCUMENTS

| | | | |
|---|---|---|---|
| 8,319,618 B2 | 11/2012 | Gomi et al. | |
| 8,503,729 B2* | 8/2013 | Kumagai | G06T 7/0065 348/118 |
| 2007/0041659 A1* | 2/2007 | Nobori | B60R 1/00 382/284 |
| 2009/0257659 A1* | 10/2009 | Suzuki | B60R 1/00 382/199 |
| 2010/0134325 A1 | 6/2010 | Gomi et al. | |
| 2012/0069188 A1* | 3/2012 | Ohno | B60R 1/00 348/148 |
| 2013/0135474 A1* | 5/2013 | Sakano | G06T 7/80 348/148 |
| 2014/0002614 A1* | 1/2014 | Hendricks | H04N 13/0018 348/47 |
| 2015/0009329 A1* | 1/2015 | Ishimoto | B60R 1/00 348/148 |
| 2015/0319370 A1* | 11/2015 | Wang | B60R 1/00 348/148 |
| 2016/0165215 A1* | 6/2016 | Gu | G06K 9/20 348/43 |

FOREIGN PATENT DOCUMENTS

| | | |
|---|---|---|
| JP | 2010-204821 | 9/2010 |
| JP | 4956799 | 6/2012 |
| WO | WO 20141174884 A1 | 10/2014 |

OTHER PUBLICATIONS

Office Action dated Sep. 1, 2017, in European Patent Application No. 16 153 693.3.

* cited by examiner

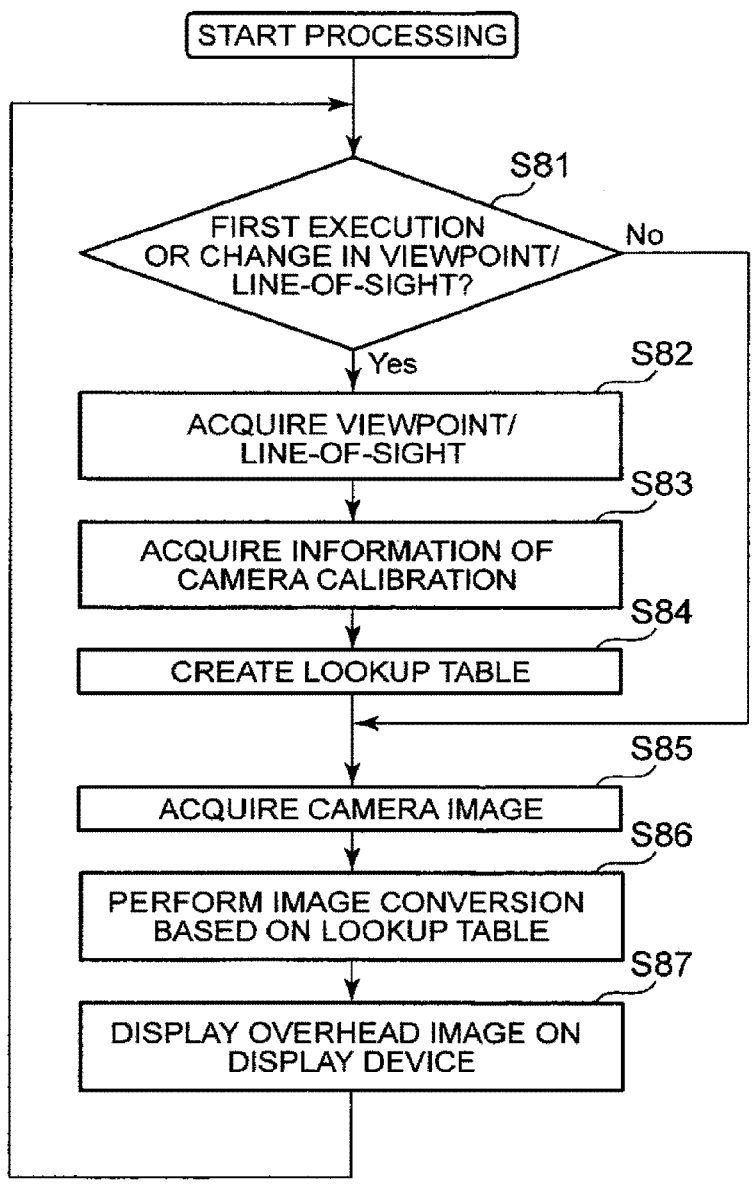

OVERHEAD IMAGE GENERATION APPARATUS

CROSS-REFERENCE TO RELATED APPLICATIONS

This application is based upon and claims the benefit of priority from the prior Japanese Patent Application No. 2015-111235 filed on Jun. 1, 2015, the entire contents of which are incorporated herein by reference.

FIELD

Embodiments described herein relate generally to an overhead image generation apparatus.

BACKGROUND

In recent years, technological development concerning an apparatus that displays an overhead image from a virtual viewpoint above a vehicle using a plurality of cameras that monitor a periphery of the vehicle has been advanced.

For example, a technology that performs correction based on an obtained image, one that changes a ground-plane range based on a height of a camera, one that connects two planes, and one that directly depicts camera data on a single projecting surface are proposed.

However, the above technologies have a problem in that horizontal line positions of overhead images of cameras do not coincide with each other.

BRIEF DESCRIPTION OF THE DRAWINGS

FIG. 8 is a flowchart illustrating a processing flow up to display of the overhead image;

DETAILED DESCRIPTION

Figure 1:
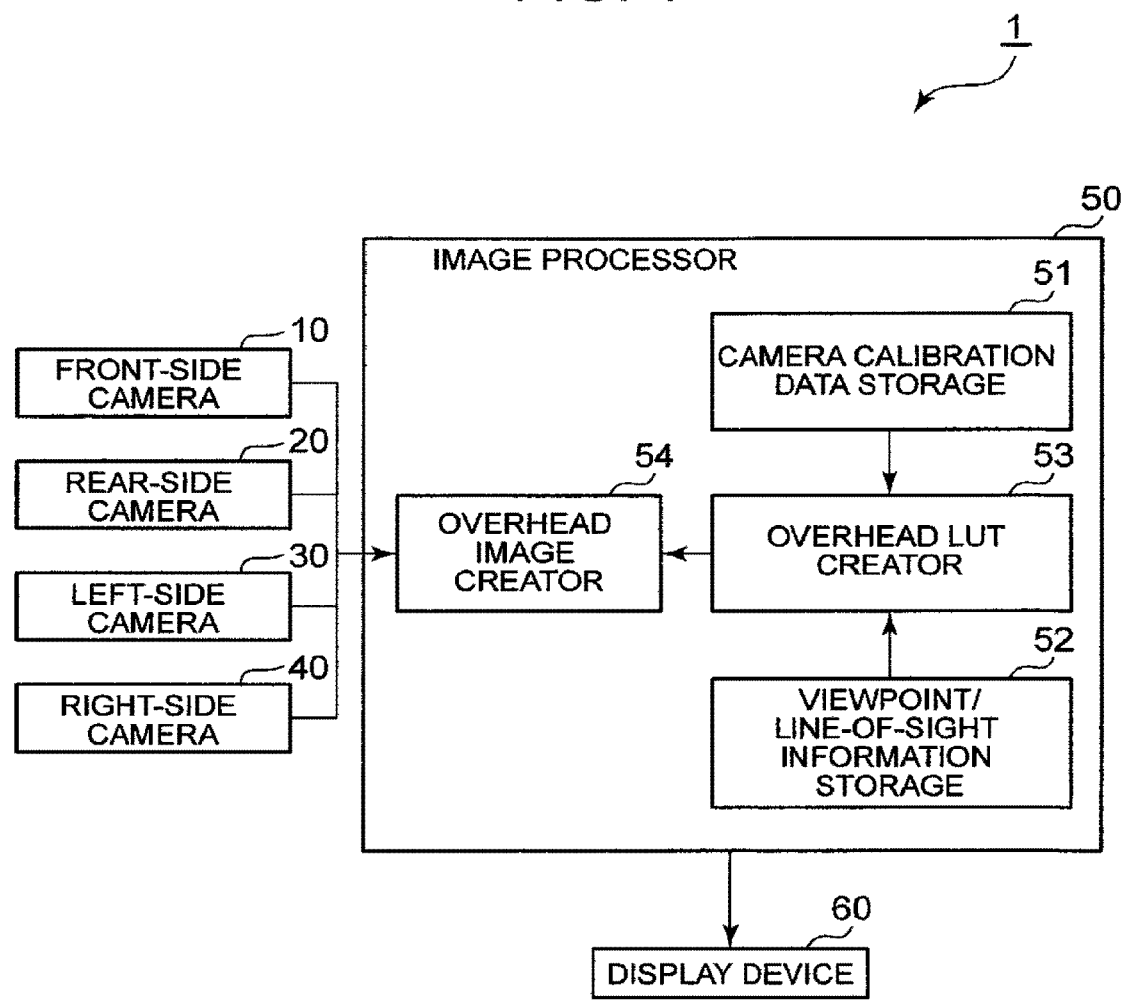
FIG. 1 is a view illustrating a configuration example of an overhead image generation apparatus according to a first embodiment of the present invention.

According to one embodiment, an overhead image generation apparatus includes: a plurality of cameras mounted to a vehicle; an image processor that takes in images of respective cameras, generates, for respective cameras, overhead images that have been subjected to viewpoint conversion processing based on calibration data of the cameras and virtual viewpoint/line-of-sight information, and generates a synthesized overhead view by connecting the overhead images at their boundaries; and a display device that displays the synthesized overhead view generated by the image processor, wherein a proportion of a shape of the overhead image in a height direction is changed in proportion to an arrangement height of each camera.

Hereinafter, embodiments of the present invention will be described with reference to the drawings. Throughout the accompanying drawings, the same reference numerals are used to designate the same parts, and redundant descriptions thereof are omitted.

<First Embodiment>

FIG. 1 is a view illustrating a configuration example of an overhead image generation apparatus according to a first embodiment of the present invention. As illustrated in FIG. 1, an overhead image generation apparatus 1 mainly includes a front-side camera 10, a rear-side camera 20, a left-side camera 30, a right-side camera 40, an image processor 50, and a display device 60.

The front-side camera 10 takes an image outside of a vehicle and is mounted to a front side of a vehicle. By the front-side camera 10, an image of the front side of the vehicle is acquired.

The rear-side camera 20 takes an image outside the vehicle and is mounted to a rear side of the vehicle. By the rear-side camera 20, an image of the rear side of the vehicle is acquired.

The left-side camera 30 takes an image outside the vehicle and is mounted to a left side of the vehicle. By the left-side camera 30, an image of the left side of the vehicle is acquired.

The right-side camera 40 takes an image outside the vehicle and is mounted to a right side of the vehicle. By the right-side camera 40, an image of the right side of the vehicle is acquired.

An overhead image is an image looking down from just above the vehicle in a vertical direction, which is obtained by applying viewpoint conversion to the image taken by the camera. By synthesizing a plurality of overhead images, a synthesized overhead image looking down the periphery of the vehicle from just above the vehicle is generated. This allows a user, i.e., a driver of the vehicle to continuously visually confirm the vehicle periphery on a single screen. The image processor 50 according to the present embodiment generates a synthesized overhead image (hereinafter, sometimes referred to merely as "overhead image") in which horizontal lines of a plurality of overhead images are aligned. The alignment of the horizontal lines among the overhead images will be described later.

The image processor 50 includes a camera calibration data storage 51, a viewpoint/line-of-sight information storage 52, an overhead LUT creator 53, and an overhead image generator 54.

The camera calibration data storage 51 stores previously acquired camera calibration data of each camera. A distortion may occur in the image taken through the camera due to a distortion of a camera lens or depending on a focal distance. Further, the image taken through the camera is subject not only to the camera characteristics (lens distortion and focal distance), but also to an arrangement position of the camera on the vehicle. The camera calibration data includes specifications related to the camera characteristics.

A user can set a viewpoint/line-of-sight direction of the synthesized overhead image. The viewpoint is defined, in a three-dimensional coordinate system, by coordinates (x, y, z) of the viewpoint and a line-of-sight direction (vx, vy, vz, θ) obtained by rotating a reference line-of-sight vector about an arbitrary rotation axis vector (vx, vy, vz) by θ radians. The viewpoint/line-of-sight information storage 52 stores viewpoint/line-of-sight information related to the viewpoint/line-of-sight direction.

The overhead LUT creator 53 takes in the camera calibration data and viewpoint/line-of-sight information and creates a coordinate conversion lookup table for viewpoint conversion of the image taken by the camera. The lookup table stores, in a table form, pixel values after coordinate conversion that have been previously calculated for pixels of the image taken by each camera. Thus, it is possible to effectively perform coordinate conversion by referring to the table without performing calculation for each necessity.

Recreation of the lookup table associated with a change of a virtual viewpoint or line-of-sight may take much time. In such a case, it is preferable to prepare the lookup table with limited viewpoint or line-of-sight. As a result, it is possible to switch images with a smooth motion.

Further, it is preferable to previously limit a changeable amount of the viewpoint/line-of-sight from the current viewpoint/line-of-sight and to create the lookup tables corresponding to the number of divided change amounts of the viewpoint/line-of-site. When there occurs a change in the current viewpoint/line-of-site, it may be possible to calculate the change amount from the viewpoint/line-of-sight before and after the change and to recreate the lookup tables corresponding to the number of divided change amounts thereof. This can reduce the number of buffers for calculation to thereby smoothly switch images.

Further, it may be possible to create the lookup tables corresponding to the number of divided change amounts of the viewpoint/line-of-sight after the change amount of the viewpoint/line-of-sight is fixed and to change the viewpoint/line-of-sight after the creation of the lookup tables. This allows the synthesized overhead image to be smoothly switched.

The overhead image generator 54 takes in a front-side image outside the vehicle taken by the front-side camera, a rear-side image outside the vehicle taken by the rear-side camera, a left-side image outside the vehicle taken by the left-side camera, a right-side image outside the vehicle taken by the right-side camera, inputs thereto information of the lookup table from the overhead LUT creator 53, generates overhead images for respective cameras by changing a proportion of a shape in the height direction in proportion to the height of each camera, and connects the overhead images at their boundaries while aligning the horizontal lines thereof to generate a synthesized overhead image. Details of generation of the overhead image and alignment of the horizontal lines among the overhead images will be described later.

The display device 60 displays the synthesized overhead image generated by the image processor 50.

The image processor 50 of the overhead image generation apparatus 1 according to the present embodiment can be realized by using a general-purpose CPU and software operating on the CPU. The present embodiment can be implement as a program allowing such a CPU to execute a series of processing procedures related to acquisition of the image from each camera, creation of the coordinate conversion lookup table for viewpoint conversion of the image using the taken-in camera calibration data and viewpoint/line-of-sight information, generation of the overhead images based on the lookup table information, and synthesis of the overhead images.

The following describes details of generation of the overhead images and alignment of the horizontal lines among the overhead images in the thus configured overhead image generation apparatus 1.
<Generation of Overhead Images>

The front-side image of the vehicle is acquired by the front-side camera 10. A body of the vehicle and a ground area at the vehicle front side appear on the front-side image. The rear-side image of the vehicle is acquired by the rear-side camera 20. The vehicle and a ground area at the vehicle rear side appear on the rear-side image. Further, the left-side image is acquired by the left-side camera 30, and right-side image is acquired by the right-side camera 40. The vehicle and a ground area at the vehicle left side appear on the left-side image, and vehicle and a ground area at the vehicle right side appear on the right-side image.

The overhead image generator 54 takes in image information from each camera and performs coordinate-conversion based on the lookup table stored in the overhead LUT creator 53 such that the viewpoint/line-of-sight direction is downward in the vertical direction from just above the vehicle. That is, the overhead image generator 54 performs coordinate-conversion for the front-side image to generate a coordinate-converted image looking down at the vehicle front side from just above. Similarly, the overhead image generator 54 generates, from the rear-side image, a coordinate-converted image looking down at the vehicle rear side from just above. Further, the overhead image generator 54 generates, from the left-side image, a coordinate-converted image looking down at the vehicle left side from just above and generates, from the right-side image, a coordinate-converted image looking down at the vehicle right side from just above.

Then, the overhead image generator 54 synthesizes the coordinate-converted overhead images to generate an overhead image looking down at the periphery of the vehicle in the vertical direction from just above. The overhead image generator 54 disposes the vehicle at a center portion of the overhead image.
<Alignment of Horizontal Lines>

Figure 2:
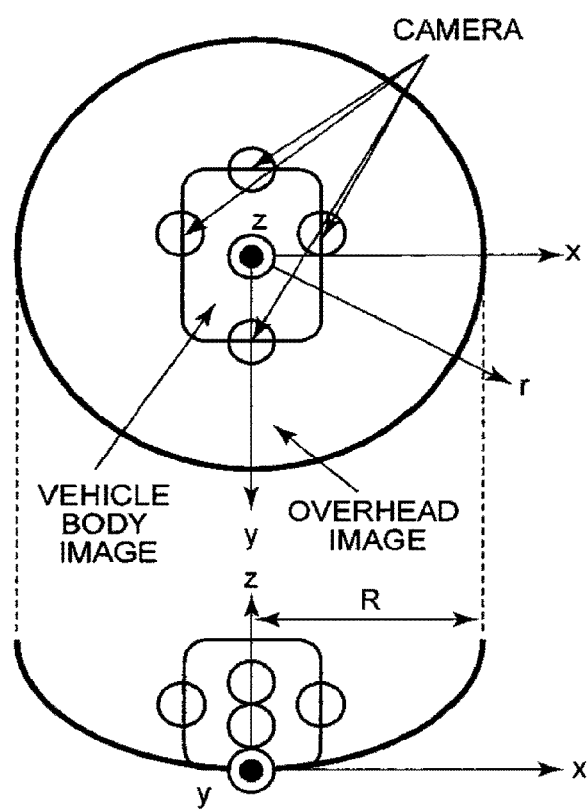
FIG. 2 is a view illustrating a basic positional relationship among a vehicle image, cameras, and an overhead image in the present embodiment.

FIG. 2 is a view illustrating a basic positional relationship among a vehicle image, cameras, and overhead image. In an x, y, z coordinate system as illustrated in FIG. 2, a basic shape of the overhead image is represented as $z=f(r)$, where a radial direction from a vehicle center is r, and an arrangement height of the overhead image relative to a radius is z. Further, in FIG. 2, R denotes a maximum radius at the arrangement height z of the overhead image.

Figure 3:
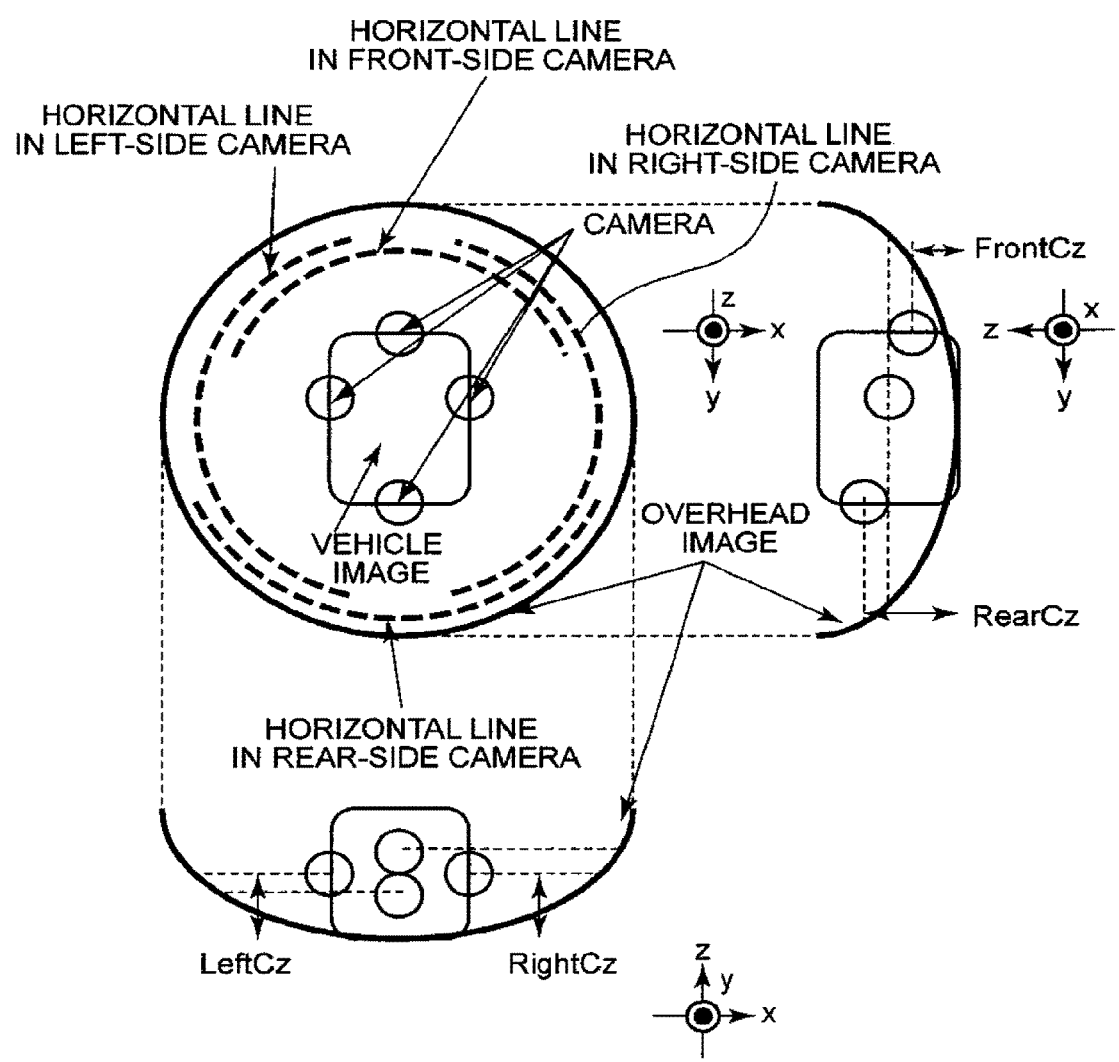
FIG. 3 is a view for explaining a misalignment of horizontal lines among the overhead images based on images of respective camera.

FIG. 3 is a view for explaining a misalignment of the horizontal lines among the overhead images based on images of the respective camera. The overhead image $f(r)$ can be represented as $f(r)=c*r^2$ or $f(r)=c*r^3$, where c is a proportional constant; however, it is here represented as $f(r)=c*r(R-\sqrt{(R^2-r^2)})$ as illustrated in FIG. 3. As described above, a part of the vehicle and a part of the ground area on which the vehicle is positioned. As illustrated in FIG. 3, in a case where a virtual viewpoint is set so as to be directed just downward from just above in a parallel projection mode (details of which will be described in a second embodiment), if the arrangement heights of the cameras differ from one another, a position of the horizontal line to be displayed in accordance with the arrangement height of each camera differs among the overhead images. In this state, the positions of the horizontal lines differ from each other at the boundary of the two camera images at which they are overlapped, with the result that two overhead images with misaligned horizontal lines are obtained. In the example of FIG. 3, the front-side camera 10 and the rear-side camera 20 have the largest difference in arrangement height and, accordingly, misalignment between the position of the horizontal line in the overhead image of the front-side camera 10 and the position of the horizontal line in the overhead image of the rear-side camera 20 is largest.

Figure 4:
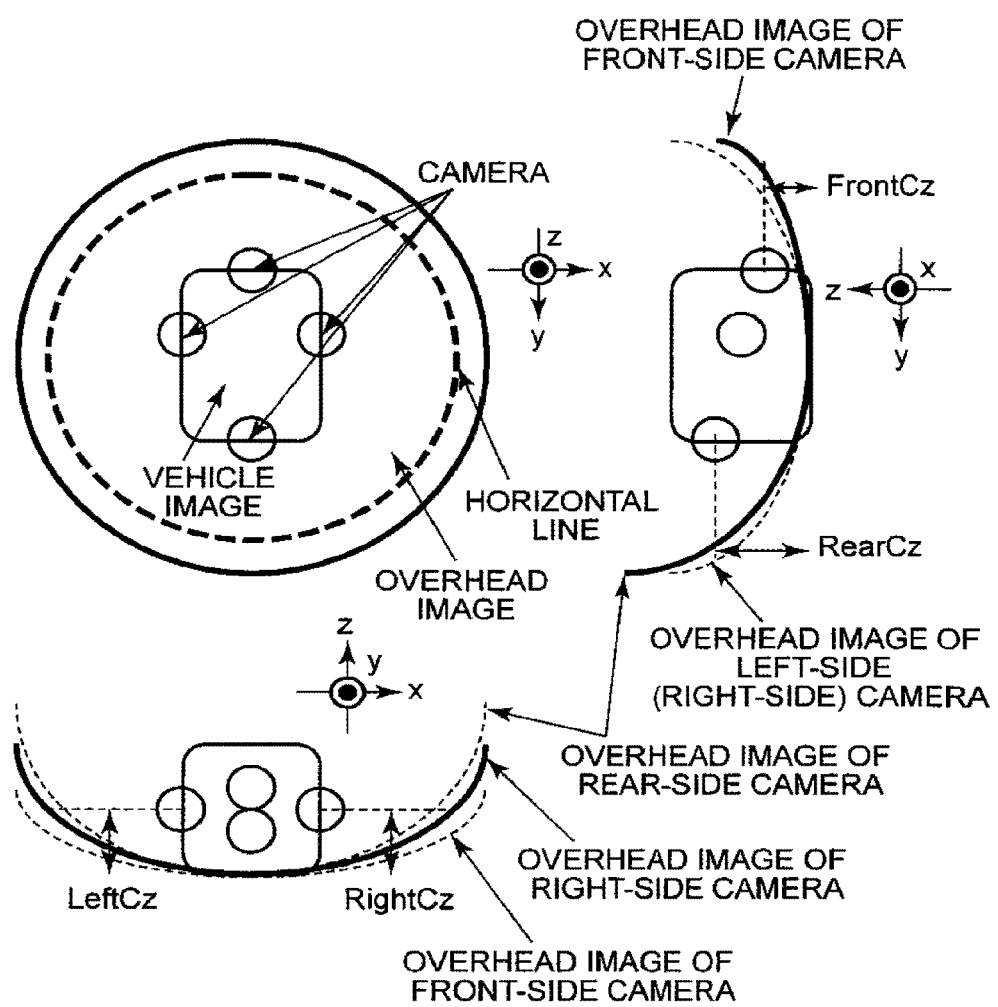
FIG. 4 is a view for explaining an overhead image in which a height direction of a shape thereof is made proportional to an arrangement height of the camera.

To cope with this, in the present embodiment, a projecting surface is separately prepared for each camera. FIG. 4 is a view for explaining an overhead image in which the height direction of the shape thereof is made proportional to the arrangement height of the camera. In the present embodiment, as illustrated in FIG. 4, the overhead image f(r) is represented by a calculation formula in which it is made proportional to an arrangement height $C_z$ of the camera. Specifically, the overhead image f(r) is represented as follows: $f(r)=C_z*g(r)$, where $g(r)=(1/DefC_z* (R-\sqrt{(R^2-r^2)})$ The $DefC_z$ is a standard arrangement height of the camera. Thus, although the projecting surfaces of the overhead images of respective cameras are represented by different calculation formulas, a distance between the horizontal line position and the center of the overhead image is the same in all the overhead images. Thus, as illustrated in FIG. 4, in the synthesized overhead image, the positions of the horizontal lines are aligned.

(First Modification)

The following describes a modification that reduces a feeling of strangeness in displaying the overhead image based on the image of each camera not by freely changing the viewpoint/line-of-sight but by changing the shape of the overhead image.

Figure 5:
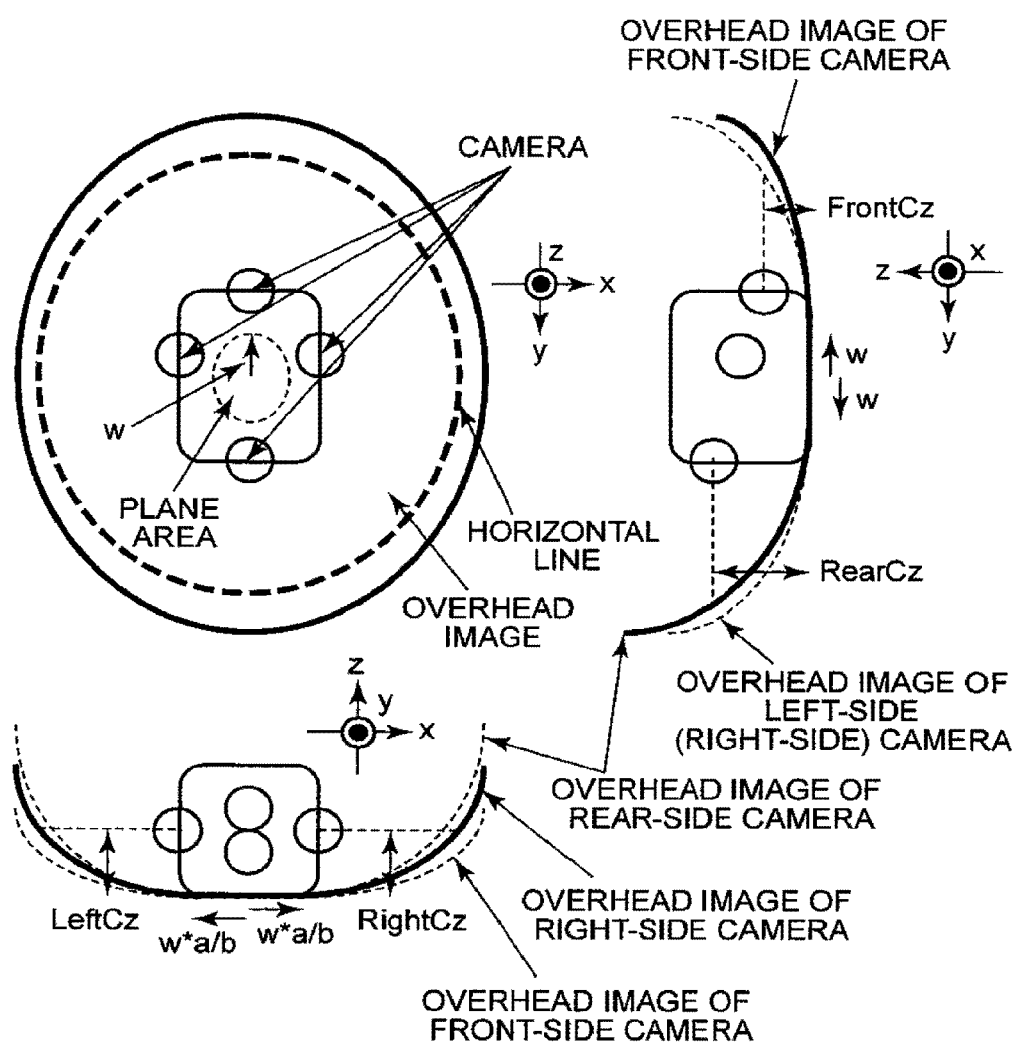
FIG. 5 is a view for explaining an overhead image having a ground plane area in a radial direction from the center of the vehicle and having a changed aspect ratio.

FIG. 5 is a view for explaining an overhead image having a ground plane area in the radial direction from the center of the vehicle and having a changed aspect ratio. In the example of FIG. 5, a radial direction r with respect to the vehicle center is represented as $r=\sqrt{(x^2/a^2+y^2/b^2)}$, where a and b are each a proportional constant.

Alternatively, $g(r)=0(r<w)$, $f(r)=C_z*c*(R-\sqrt{(R^2-(r-w)^2)})$ may be adopted, assuming that the plane (z=0) area extends by a distance of w in the radial direction r. According to such a display method, a sense of distance from the ground plane near the vehicle in the vehicle image becomes proper, thereby reducing the feeling of strangeness.

(Second Modification)

Figure 6:
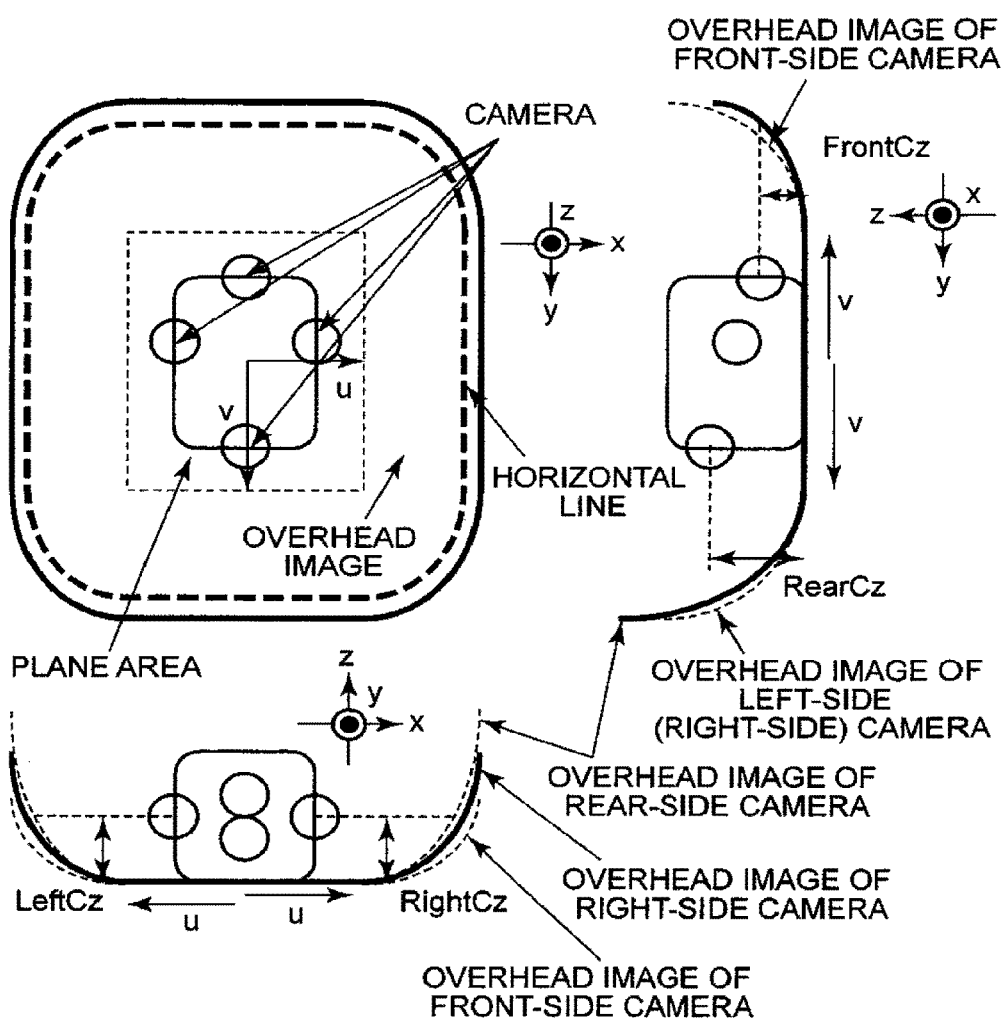
FIG. 6 is a view explaining an overhead view having the ground plane area in the longitudinal and lateral directions from the center of the vehicle and having a changed aspect ratio.

The ground plane area may be defined by longitudinal and lateral directions, not by the radial direction r. FIG. 6 is a view explaining an overhead view having the ground plane area in the longitudinal and lateral directions from the center of the vehicle and having a changed aspect ratio. In the example of FIG. 6, a plane (z=0) area extends by a distance of v in an x-direction and by a distance of u in a y-direction. In the example of FIG. 6, the radial direction r with respect to the vehicle center is represented as $r=\sqrt{((x-u)^2/a^2+(y-v)^2/b^2)}$, where a and b are each a proportional constant, and x>0, y>0. When x<0 and y<0, the radial direction r with respect to the vehicle center is represented as $r=\sqrt{((x+u)^2/a^2+(y+v)^2/b^2)}$.

Alternatively, the ground plane may be defined by combination of the radial direction r, x-direction, and y-direction. Alternatively, a center of the overhead image shape may be shifted from the vehicle center.

According to the second modification, a sense of distance from the ground plane near the vehicle in the vehicle image becomes proper, thereby reducing the feeling of strangeness.

(Third Modification)

Figure 7A:
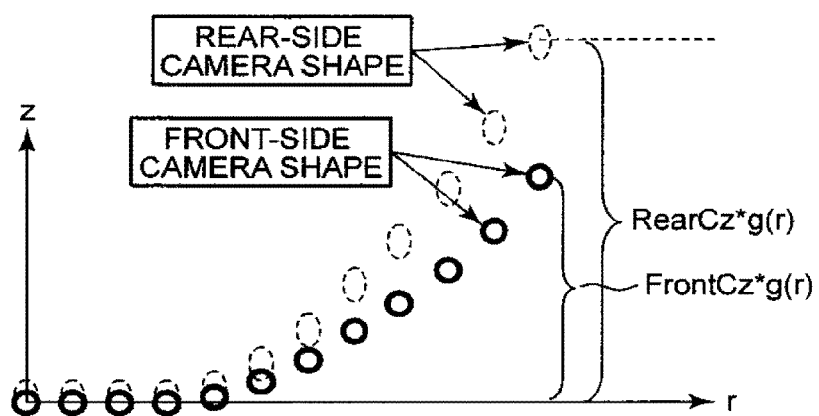
FIGS. 7A and 7B are views for explaining an example in which an overhead image shape is arbitrarily specified.
Figure 7B:
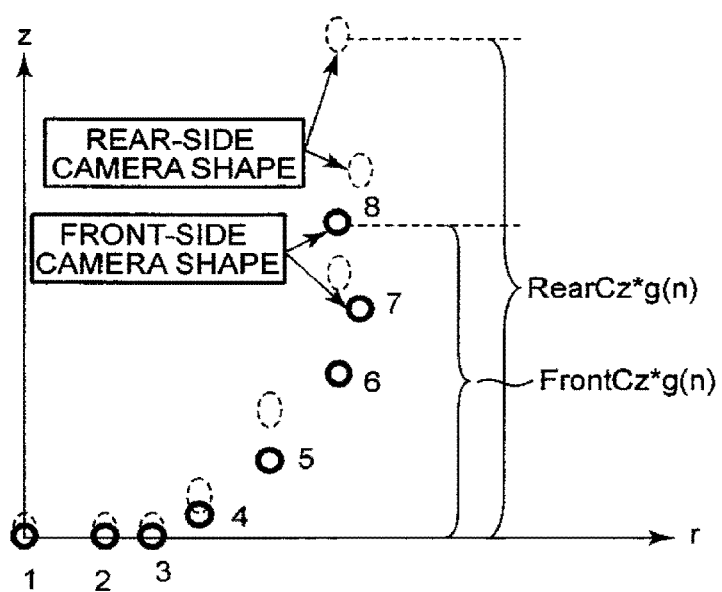

The shape of the overhead image need not be made uniform, but may be arbitrarily specified. FIGS. 7A and 7B are views for explaining an example in which the overhead image shape is arbitrarily specified. In the example of FIG. 7A, an overhead image shape g(r) is plotted for each change of the radial direction r to be arbitrarily specified as linear interpolation or spline interpolation. Alternatively, as illustrated in the example of FIG. 7B, a plot order is previously determined, and a relationship between a distance in the radial direction and camera arrangement height is plotted, not for each change of the radial direction r, but arbitrarily, for specification of the overhead image shape as linear interpolation or spline interpolation. In the example of FIG. 7B, a radial direction distance $r_n$ and a camera arrangement height g (n) are determined for each plotted point (n=0, 1, 2, . . . ).

According to the above methods of specifying the overhead image shape, it is possible to express an arbitrary overhead image shape in such a manner that the distance in the radial direction is increased as the camera arrangement height is increased and then reduced.

Further, the radial direction r with respect to the vehicle center may be changed in a change rate between the longitudinal and lateral directions so as to satisfy $r=\sqrt{(x^2/a^2+y^2/b^2)}$, where a and b are each a proportional constant. A value of the overhead image obtained in this case also changes in proportion to the camera arrangement height.

The following describes a flow of processing to be performed in the thus configured overhead image generation apparatus 1. FIG. 8 is a flowchart illustrating a processing flow up to display of the overhead image.

First, it is determined whether it is the first execution of the processing up to display of the overhead image or the viewpoint/line-of-sight is changed (step S81).

When Yes is obtained in step S81, information of the viewpoint/line-of-sight is acquired (step S82). When NO is obtained in step S81, the flow shifts to step S85. Then, information of the camera calibration stored in the camera calibration data storage 51 is acquired (step S83).

Subsequently, the overhead LUT creator 53 creates, based on the camera calibration data and viewpoint/line-of-sight information, the coordinate conversion lookup table for viewpoint conversion of the image taken by the camera (step S84). Details of the lookup table creation processing will be described later.

Then, the overhead image generator 54 acquires the image from each camera (step S85).

Subsequently, the overhead image generator 54 performs coordinate conversion for the camera image based on the lookup table and then synthesizes the obtained coordinate-converted images to generate an overhead image (step S86). In the present embodiment, an overhead image in which the horizontal lines of the camera images are aligned is generated.

Then, the overhead image in which the horizontal lines of the camera images are aligned is displayed on the display device 60 (step S87).

Figure 9:
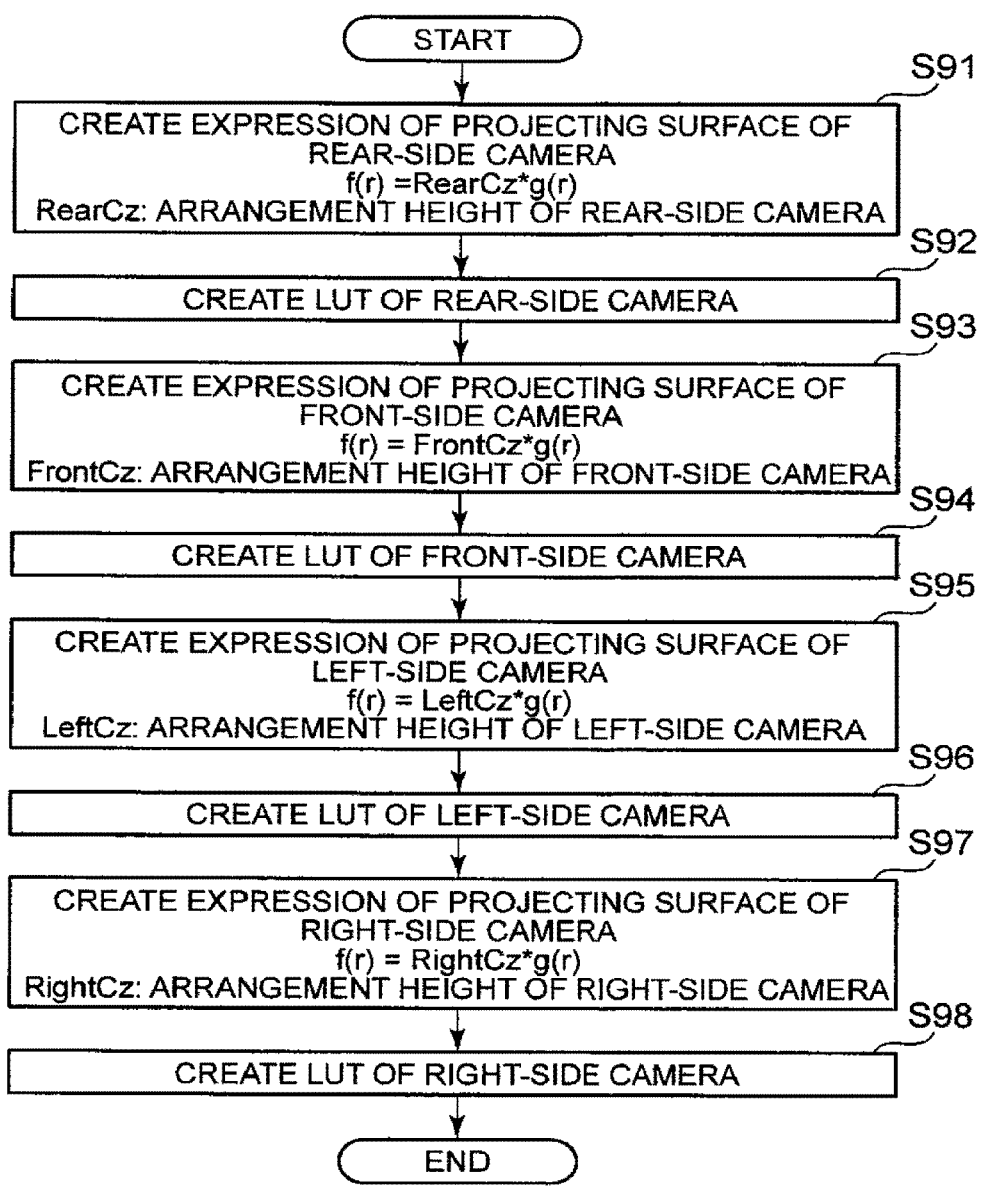
FIG. 9 is a flowchart illustrating a flow of lookup table creation processing.

FIG. 9 is a flowchart illustrating a flow of lookup table creation processing.

First, an expression of a projecting surface of the rear-side camera is created (step S91). Assuming that the arrangement height of the rear-side camera is $RearC_z$, the expression is represented as $f(r)=RearC_z*g(r)$.

Then, a lookup table for the rear-side camera is created (step S92).

Subsequently, an expression of a projecting surface of the front-side camera is created (step S93). Assuming that the arrangement height of the front-side camera is $FrontC_z$, the expression is represented as $f(r)=FrontC_z*g(r)$.

Then, a lookup table for the front-side camera is created (step S94).

Subsequently, an expression of a projecting surface of the left-side camera is created (step S95). Assuming that the arrangement height of the left-side camera is $LeftC_z$, the expression is represented as $f(r)=LeftC_z*g(r)$.

Then, a lookup table for the left-side camera is created (step S96).

Subsequently, an expression of a projecting surface of the right-side camera is created (step S97). Assuming that the arrangement height of the right-side camera is $RightC_z$, the expression is represented as $f(r)=RightC_z*g(r)$.

Then, a lookup table for the right-side camera is created (step S98), and the lookup table creation processing is ended.

<Second Embodiment>

Figure 10:
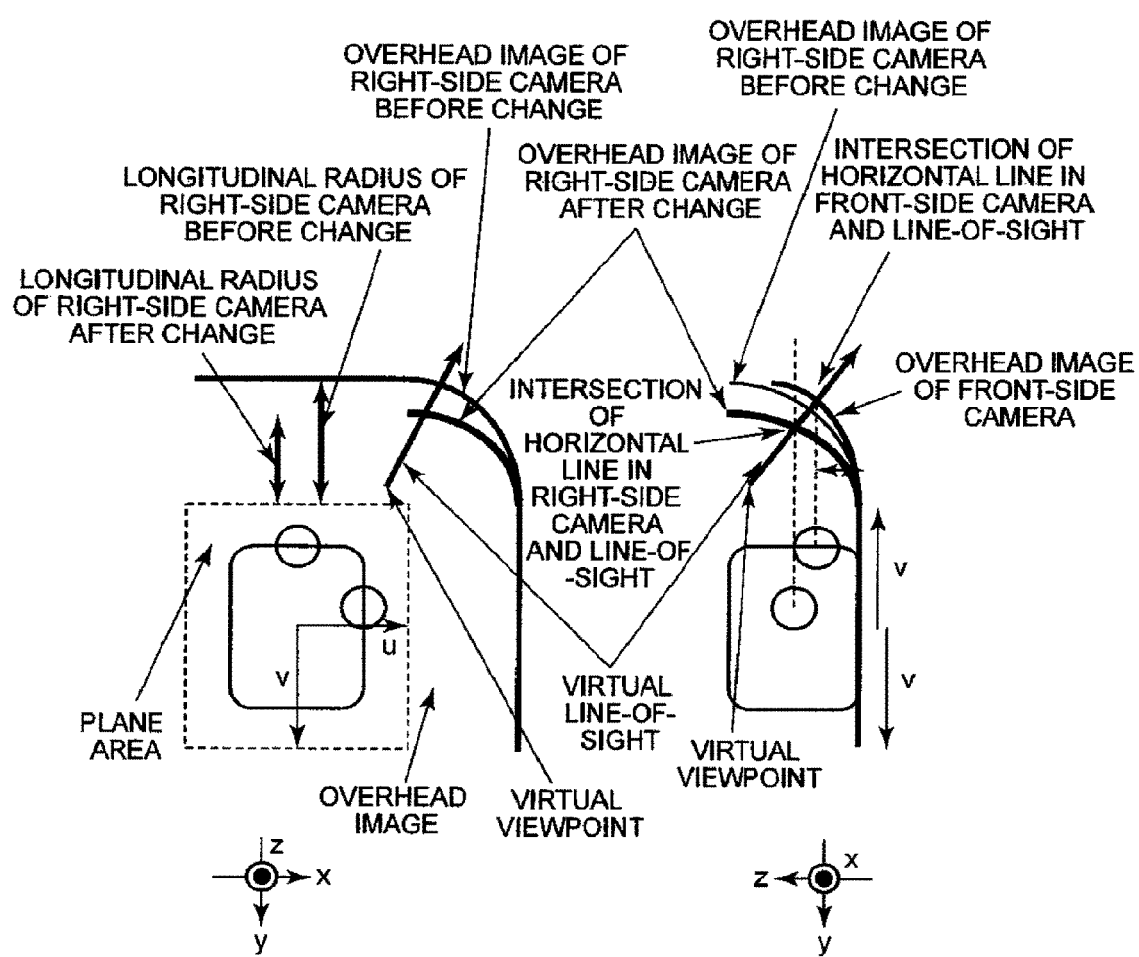
FIG. 10 is a view for explaining an overhead image in a case where a viewpoint position is arbitrarily set in a second embodiment.

Next, a second embodiment will be described. A configuration of the overhead image generation apparatus 1 according to the second embodiment is basically the same as that of the overhead image generation apparatus 1 according to the first embodiment. The second embodiment relates to an alignment of horizontal lines in the overhead images in a case where a viewpoint position is arbitrarily set. FIG. 10 is a view for explaining an overhead image in a case where a viewpoint position is arbitrarily set in the second embodiment.

Projection conversion is required in order to project (display) a three-dimensional world onto a two-dimensional projection surface. The projection method roughly includes parallel projection and perspective projection. In parallel projection, objects of the same size are displayed in the same size irrespective of a distance from the viewpoint. For example, when an x-y plane is set as the projection surface, a z coordinate is set to 0. In the perspective projection, even when two objects are the same in size, a distant one looks small, and near one looks large. Generally, in the perspective projection, when parallel ridgelines are extended, they cross at the same point (vanishing point), and the number of the vanishing points changes from one to three depending on the line-of-sight direction. When the line-of-sight direction can freely be controlled, the number of the vanishing point is three, in general.

In a case where the perspective projection conversion is performed when the viewpoint is directed from just above to just below or when the viewpoint is directed obliquely, not from just above to just below, the horizontal line positions are not aligned even when the first embodiment is applied.

Thus, in the second embodiment, a camera serving as a reference and a point on the horizontal line serving as a boundary of the reference camera, and the position of the horizontal line of another camera at the boundary of the reference camera is set to be seen in the same position as that of the horizontal line in the reference camera when viewed from the virtual viewpoint in the perspective projection conversion. On the other hand, in the parallel projection conversion, the position of the horizontal line of another camera is set to be seen in the same position as that of the horizontal line in the reference camera in the line-of-sight direction. That is, an extended line of the line-of-sight direction passing through the point on the horizontal line is made coincide with the horizontal line in the another camera. In the example of FIG. 10, the front-side camera is used as the reference camera, and the right-side camera is used as the another camera at the boundary of the reference camera.

As a method for the alignment of the horizontal lines in the second embodiment, a magnification of the radial direction r with respect to the vehicle center is changed, as in $r=a*s$, where a is a proportional constant, and s is a variable used in place of r.

Further, when the aspect ratio is changed as in $r=\sqrt{(x^2/a^2+y^2/b^2)}$ (a and b are each a proportional constant), b which is a longitudinal constant may be changed for the front-side camera and the rear-side camera, while a which is a lateral constant may be changed for the left-side camera and the right-side camera. Further, when a position corresponding to the boundary between the two cameras is near the front-side camera and the rear-side camera, b which is the longitudinal constant may be changed, while when the position corresponding to the boundary between the two cameras is near the left-side camera and the right-side camera, a which is the lateral constant may be changed.

Further, a ratio between a and b may be changed based on the line-of-sight direction according to a ratio between the lateral and longitudinal directions thereof. In this case, assuming that the line-of-sight direction is (d, e, f), calculation formulas: $a=a_0*d*t$, $b=b_0*e*t$ are created, and t may be calculated such that the positions of the horizontal lines are aligned.

Further, calculation may be made such that the lateral position of the horizontal line to be aligned is not changed as viewed from the virtual viewpoint. In this case, assuming that the viewpoint is $(X_0, y_0, z_0)$ and line-of-sight direction is $(x_1, y_1, z_1)$, calculation may be made such that $(x-x_0)/x_1=(y-y_0)/y_1$ is maintained.

Further, when an area where the two camera images are overlapped is displayed in an superimposed state using α blend, calculation may be made such that the positions of the horizontal lines at both sides of the area where the two camera images are overlapped are set to be seen in the same position. In this case, the overhead image having a shape in which the calculation formula of the radial direction r is different for each camera may be calculated by fixing a and b in the calculation formula $r=\sqrt{(x^2/a^2+y^2/b^2)}$ (a and b are each a proportional constant) of one camera and changing a and b of another camera so as to align the positions of the horizontal lines.

Alternatively, the overhead image having a shape in which the calculation formula of the radial direction r is different for each camera may be calculated by fixing a of one camera and b of another camera and changing b of the one camera and a of the another camera so as to align the positions of the horizontal lines. Further, conversely, the overhead image having a shape in which the calculation formula of the radial direction r is different for each camera may be calculated by fixing b of one camera and a of another camera and changing a of the one camera and b of the another camera so as to align the positions of the horizontal lines. Further, calculation may be made such that the lateral position of the horizontal line to be aligned is not changed as viewed from the virtual viewpoint. In this case, assuming that the viewpoint is $(X_0, y_0, z_0)$ and line-of-sight direction is $(x_1, y_1, z_1)$, the overhead image having a shape in which the calculation formula of the radial direction r is different for each camera may be calculated such that $(x-x_0)/x_1=(y-y_0)/y_1$ is maintained.

Further, also in the second embodiment, the overhead view may have the ground plane area in the radial direction from the vehicle center, as illustrated in FIG. 5. In this case, the aspect ratio may be calculated with the ground plane area being removed as in $r=a*(s-w)$ (a is a proportional constant).

Further, also in the second embodiment, the overhead view may have the ground plane area in both the lateral and longitudinal directions, as illustrated in FIG. 6. In this case, the aspect ratio may be calculated with the ground plane area being removed as in $r=\sqrt{((x-u)^2/a^2+(y-v)^2/b^2)}$ (a and b are each a proportional constant).

According to the second embodiment, in a case where images of the ground area and the horizontal line area are simultaneously displayed, it is possible to align the display positions of the horizontal lines even when the arrangement heights of cameras are different.

In the above first and second embodiments, the four cameras (front-side camera, rear-side camera, right-side camera, and left-side camera) are mounted in the vehicle; however, the present invention is not limited to this, and the number of the cameras may be at least two or more.

According to the present embodiments, the misalignment of the horizontal lines which may cause a feeling of strangeness when the images of the ground area and the horizontal line area are simultaneously displayed by synthesizing the images of the plurality of cameras is corrected on the display image, whereby the overhead image can be displayed in a state free from misalignment of the horizontal lines.

While certain embodiments have been described, these embodiments have been presented by way of example only, and are not intended to limit the scope of the inventions. Indeed, the novel methods and systems described herein may be embodied in a variety of the other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An overhead image generation apparatus comprising:
   a plurality of cameras mounted to a vehicle;
   an image processor that takes in images of respective cameras, generates, for respective cameras, overhead images that have been subjected to viewpoint conversion processing based on calibration data of the cameras and virtual viewpoint/line-of-sight information, and generates a synthesized overhead view by connecting the overhead images at their boundaries; and
   a display device that displays the synthesized overhead view generated by the image processor, wherein
   the image processor includes:
   a camera calibration data storage that stores the calibration data of each camera that has been previously acquired;
   a viewpoint/line-of-sight information storage that stores viewpoint/line-of-sight information related to the viewpoint/line-of-sight direction;
   an overhead LUT creator that takes in the calibration data of each camera and the viewpoint/line-of-sight information and creates a lookup table for coordinate conversion for viewpoint conversion of the image taken by each camera previously assuming a limited viewpoint/line-of-sight; and
   an overhead image generator that takes in the images of the respective camera, inputs thereto information of the lookup table, generates a synthesized overhead image in which horizontal lines of the respective images are aligned; and
   a proportion of a shape of the overhead image in a height direction is changed in proportion to an arrangement height of each camera.

2. The overhead image generation apparatus according to claim 1, wherein
   an arrangement height of a standard camera is previously defined as a reference, and the shape of the overhead image in a height direction is made proportional to the arrangement height of each camera.

3. The overhead image generation apparatus according to claim 1, wherein
   in the viewpoint/line-of-sight information, a viewpoint is defined, in a three-dimensional coordinate system, by coordinates (x, y, z) of the viewpoint and a line-of-sight direction (vx, vy, vz, q) obtained by rotating a reference line-of-sight vector about an arbitrary rotation axis vector (vx, vy, vz) by q radians.

4. The overhead image generation apparatus according to claim 1, wherein
   a changeable amount of the viewpoint/line-of-sight from the current viewpoint/line-of-sight is previously limited, and the lookup tables corresponding to the number of divided change amounts of the viewpoint/line-of-site are created, and when there occurs a change in the current viewpoint/line-of-site, the change amount is calculated from the viewpoint/line-of-sight before and after the change, and the lookup tables corresponding to the number of divided change amounts thereof are created.

5. The overhead image generation apparatus according to claim 1, wherein
   the lookup tables corresponding to the number of divided change amounts of virtual viewpoint/virtual line-of-sight are created after the change amount of the virtual viewpoint/virtual line-of-sight is fixed, and the viewpoint/line-of-sight is changed after the creation of the lookup tables.

6. The overhead image generation apparatus according to claim 1, wherein
   the overhead image based on the image of each camera is created by applying linear interpolation or spline interpolation to a point plotted with an arbitrary distance and height.

7. The overhead image generation apparatus according to claim 1, wherein
   a camera serving as a reference is determined,
   a point on the horizontal line serving as a boundary of the reference camera is determined, and
   a position of the horizontal line of another camera at the boundary of the reference camera is set to be seen in the same position as that of the horizontal line in the reference camera when viewed in the line-of-view direction.

8. The overhead image generation apparatus according to claim 1, wherein
   the positions of the horizontal lines at both sides of the area where the two camera images are overlapped are aligned to be seen in the same position when viewed in the line-of-view direction.

9. The overhead image generation apparatus according to claim 2, wherein
   the cameras mounted to the vehicle include:
   a front-side camera that is mounted to a front side of the vehicle and takes an image of the front side of the vehicle;
   a rear-side camera that is mounted to a rear side of the vehicle and takes an image of the rear side of the vehicle;

a left-side camera that is mounted to a left side of the vehicle and takes an image of the left side of the vehicle; and a right-side camera that is mounted to a right side of the vehicle and takes an image of the right side of the vehicle.

10. The overhead image generation apparatus according to claim 9, wherein the calibration data of the camera includes information on a mounting point of each camera on the vehicle, in addition to camera characteristic information including a lens distortion and a focal distance.

11. An overhead image generation apparatus comprising:

a plurality of cameras mounted to a vehicle;

an image processor that takes in images of respective cameras, generates, for respective cameras, overhead images that have been subjected to viewpoint conversion processing based on calibration data of the cameras and virtual viewpoint/line-of-sight information, and generates a synthesized overhead view by connecting the overhead images at their boundaries; and a display device that displays the synthesized overhead view generated by the image processor, wherein a proportion of a shape of the overhead image in a height direction is changed in proportion to an arrangement height of each camera;

the overhead image based on the image of each camera has a ground plane area in a radial direction from a vehicle center and is created by changing an aspect ratio thereof.

12. An overhead image generation apparatus comprising:

a plurality of cameras mounted to a vehicle;

an image processor that takes in images of respective cameras, generates, for respective cameras, overhead images that have been subjected to viewpoint conversion processing based on calibration data of the cameras and virtual viewpoint/line-of-sight information, and generates a synthesized overhead view by connecting the overhead images at their boundaries; and a display device that displays the synthesized overhead view generated by the image processor, wherein a proportion of a shape of the overhead image in a height direction is changed in proportion to an arrangement height of each camera;

the overhead image based on the image of each camera has a ground plane area in a longitudinal and lateral directions from the vehicle center and is created by changing an aspect ratio thereof.

* * * * *